United States Patent [19]

Nagai et al.

[11] 4,007,590
[45] Feb. 15, 1977

[54] CATALYTIC CONVERTOR WARMING UP SYSTEM

[75] Inventors: Tadashi Nagai, Yokosuka; Kunihiko Sugihara, Yokohama, both of Japan

[73] Assignee: Nissan Motor Co., Ltd., Japan

[22] Filed: May 30, 1975

[21] Appl. No.: 582,275

[30] Foreign Application Priority Data

June 1, 1974 Japan .................. 49-626340

[52] U.S. Cl. .................. 60/284; 60/285; 123/32 EA; 123/198 F
[51] Int. Cl.² .................. F02B 75/10
[58] Field of Search ............ 60/284, 285, 277; 123/198 F, 32 EA

[56] References Cited

UNITED STATES PATENTS

| | | | |
|---|---|---|---|
| 3,430,616 | 3/1969 | Glockler | 123/32 EA |
| 3,463,130 | 8/1969 | Reichardt | 123/32 EA |
| 3,472,068 | 10/1969 | List | 60/277 |
| 3,662,540 | 5/1972 | Murphey | 60/301 |
| 3,703,162 | 11/1972 | Aono | 123/32 EA |
| 3,732,696 | 5/1973 | Masaki | 60/284 |
| 3,800,772 | 4/1974 | Gospodar | 60/284 |
| 3,896,779 | 7/1975 | Omori | 123/139 E |
| 3,916,622 | 11/1975 | Gospodar | 123/198 F |

FOREIGN PATENTS OR APPLICATIONS 2,133,996  1/1973  Germany .............. 60/285

*Primary Examiner*—Douglas Hart
*Attorney, Agent, or Firm*—Robert E. Burns; Emmanuel J. Lobato; Bruce L. Adams

[57] ABSTRACT

A fuel injection system supplies fuel to only selected cylinders until the catalytic converter is heated sufficiently.

3 Claims, 3 Drawing Figures

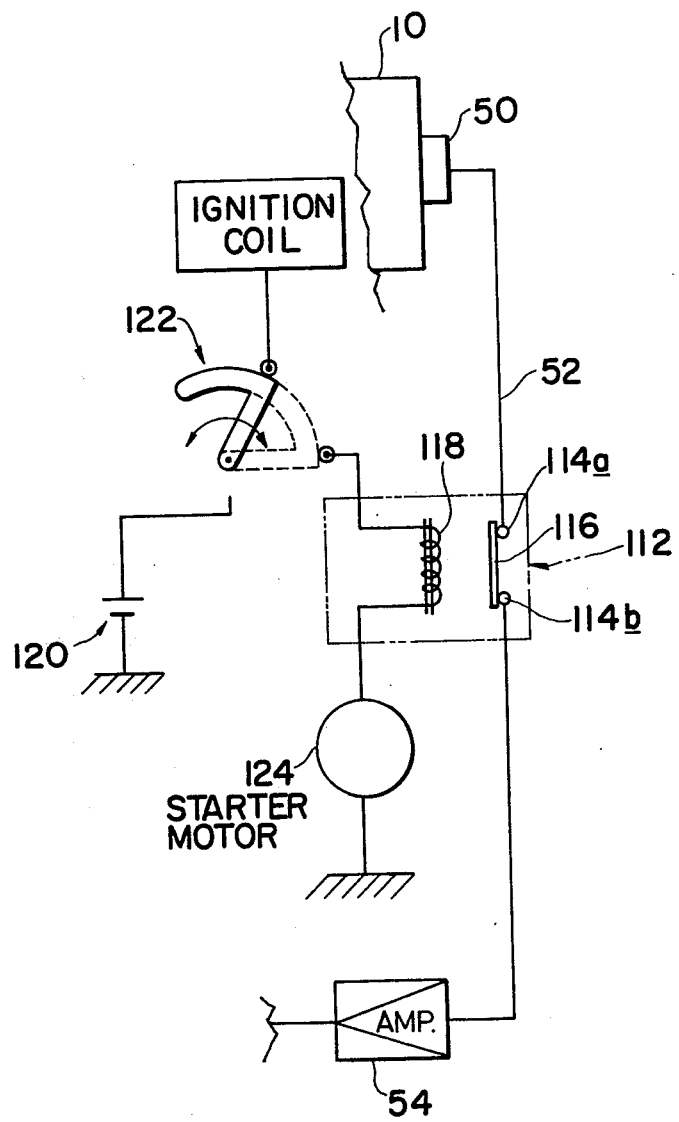

CATALYTIC CONVERTOR WARMING UP SYSTEM

BACKGROUND OF THE INVENTION

This invention relates to an electronically controlled fuel injection system for use in an internal combustion engine having a catalytic converter, and more particularly to a system for enhancing rapid warm-up of the catalyst contained in the catalytic converter during a cold start of an engine.

It is well known in the art to increase the amount of fuel supplied into the combustion chambers of the engine during a cold start in order to provide ready ignition of the engine. As a result, the exhaust gases exhausted from the exhaust ports of the engine contain a great amount of carbon monoxide and hydrocarbons, but only a small amount of oxygen. Thus, if the engine employs a catalytic converter in the exhaust system thereof, the carbon monoxide and the hydrocarbons are introduced into the catalytic converter with a small amount of oxygen. Under these conditions, the catalyst in the converter fails to reach a suitable temperature rapidly due to the shortage of oxygen, and therefore, it takes some time before the catalyst can provide maximum performance.

SUMMARY OF THE INVENTION

It is therefore an object of the present invention to provide a fuel injection system which achieves rapid warm-up of the catalyst contained in the catalytic converter employed in an exhaust system of the internal combustion engine.

BRIEF DESCRIPTION OF THE DRAWINGS

Preferred embodiments of the present invention are illustrated in the accompanying drawings, in which:

FIG. 3 is a schematical view of a device for temporally inactivating the fuel injection system of the invention.

DESCRIPTION OF THE PREFERRED EMBODIMENTS

Figure 1:
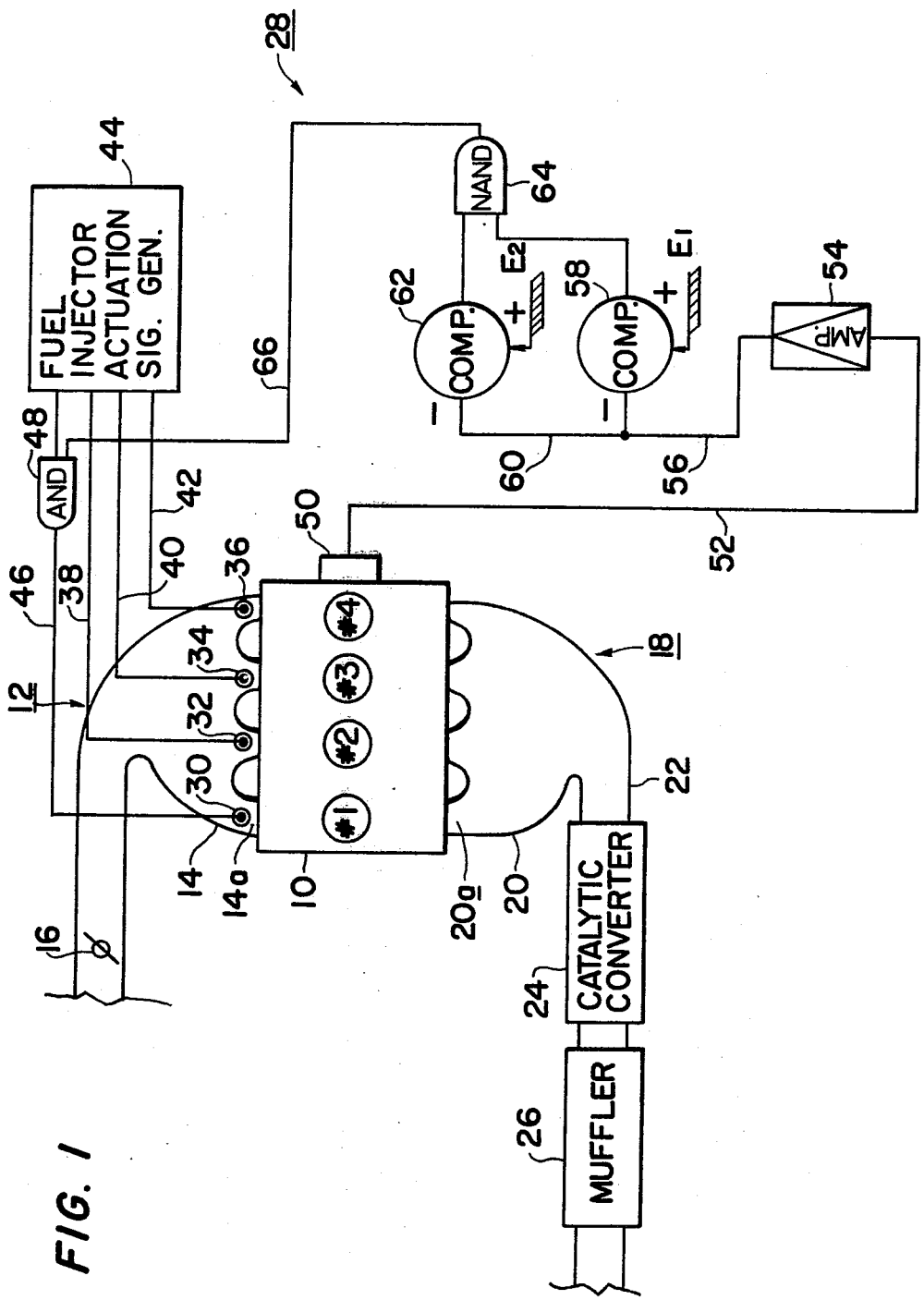
FIG. 1 is a schematic block diagram of one embodiment of a fuel injection system according to the invention.

Referring now to FIG. 1, there is schematically shown an internal combustion engine 10 of multi-cylinder type which has, in this case, four cylinders #1, #2, #3 and #4. The internal combustion engine 10 includes an intake system 12 which consists of an intake manifold 14 having a plurality of intake branch passages 14a connected to corresponding intake ports of the internal combustion engine 10. The intake system 12 further has an air throttle valve 16 at an upstream portion thereof for manually controlling the amount of the air introduced from an air filter (not shown) into the intake manifold 14.

The internal combustion engine 10 further includes an exhaust system 18 which consists of an exhaust manifold 20 having a plurality of exhaust branch passages 20a leading from corresponding exhaust ports of the internal combustion engine 10, and an exhaust pipe 22 connected to the exhaust manifold 20 in a conventional manner. Disposed in the exhaust pipe 22 is a catalytic converter 24 which is connected to a conventional muffler 26.

The electronically controlled fuel injection system is generally designated by reference numeral 28. As shown, the system 28 includes four fuel injection valves 30, 32, 34 and 36 which are respectively disposed in corresponding intake branch passages 14a of the intake manifold for intermittently closing and opening the fuel passages leading from a fuel source (not shown). Although not shown in this figure, each of the injection valves 30-36 includes a valve element to be urged by electric energization of a solenoid associated therewith so as to close or open the injection valve. These injection valves, except the valve 30, are connected through lines 38, 40 and 42 to outputs of a fuel injector actuation signal generator 44. On the other hand, the injection valve 30 is connected through a line 46 to an output of an AND gate 48 which has one input connected to an output of the fuel injector actuation signal generator 44. The fuel injector actuation signal generator 44 is so constructed as to respond to the amount of air introduced into the intake manifold 14 from the air filter and to the running condition of the engine 10 such as engine speed, engine load and engine temperature, and to produce injector actuation signals on the output terminals thereof. Therefore the amount of fuel to be injected into each branch 14a is preferably controlled.

According to this embodiment, the electronically controlled fuel injection system 28 further includes an engine temperature sensor 50 which is mounted in a coolant passage way of the engine 10 for producing a voltage signal proportionally representing the temperature of the coolant in the passage way. The output of the sensor 50 is connected through a line 52 to an input of a signal amplifier 54 which is capable of amplifying the signal transmitted from the sensor 50. The output of the signal amplifier 54 is connected through a line 56 to an input of a first comparator 58 and through a line 60 to an input of a second comparator 62. The first comparator 58 receives at another input thereof a constant voltage having a first predetermined value $E_1$ and produce a logic "1" signal when the magnitude of the signal from the signal amplifier 54 is larger than the first predetermined value $E_1$. The second comparator 52 receives at another input thereof a constant voltage having a second predetermined value $E_2$ which is larger than the value $E_1$, and produces a logic 1 signal when the magnitude of the signal from the signal amplifier 54 is lower than the second predetermined value $E_2$. In this embodiment, the first and second predetermined values $E_1$ and $E_2$ are determined so as to respectively correspond to temperatures 10° and 30° C. The outputs of the first and second comparators 58, 62 are respectively connected to inputs of a NAND gate 64 which has an output connected through a line 66 to the other input of the AND gate 48.

In operation, when the engine 10 is started and the temperature of the coolant is relatively low, for example within 10° to 30° C, both the first and second comparators 58, 62 produce the logic 1 signals on their outputs. The NAND gate 64 then produces the logic "0" signal on the output thereof in response to the logic 1 signals from the comparators 58, 62. The logic 0 signal from the NAND gate 64 is applied to the other input of the AND gate 48. Thus, the AND gate 48 cuts off the fuel injector actuation signals transmitted thereto from the signal generator 44 thereby preventing the injection valve 30 from opening while allowing the remaining valves 32–36 to open.

It is to be appreciated that when the temperature of the coolant is outside of the range 10° to 30° C, either of the two comparators 58, 62 produces logic 0 signal and therefore the NAND gate 64 transmits the logic 1 signal to the other input of the AND gate 48. As the result, all the injection valves 30–36 operate in response to the fuel injection pulses from the signal generator 44.

Accordingly, the combustion chamber #1 corresponding to the injection valve 30 acts as an air pump when the temperature of the coolant of the engine 10 is within the predetermined range such as 10° to 30° C. Thus, the air passing through the combustion chamber #1 is introduced into the exhaust manifold 20, and thereafter mixed with the exhaust gases emitted from the remaining combustion chamber #2, #3 and #4 of the engine 10. Subsequently, the air and the exhaust gases are admitted into the catalytic converter 24, in which the combustible compounds in the exhaust gases are satisfactorily oxidized and therefore, the temperature of the catalyst in the catalytic converter 24 rises quickly to a level at which the catalyst provides the normally oxidizing effect.

Figure 2:
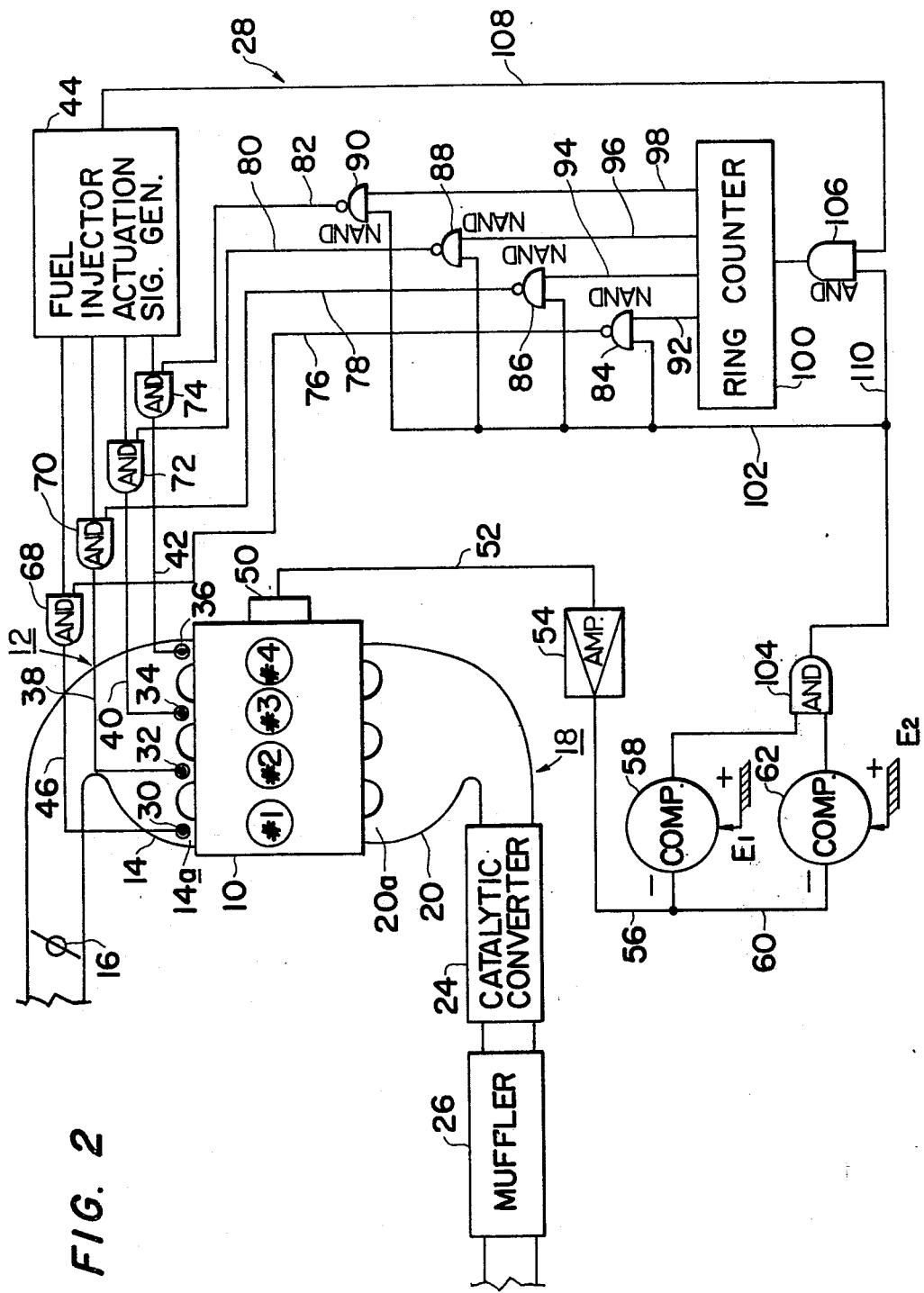
FIG. 2 is a schematic block diagram of another embodiment of the invention.

Referring to FIG. 2, there is shown another embodiment of the present invention. Explanation will not be made hereinbelow with respect to the arrangements of the engine system including an engine and the other mechanical elements which are the same as those of the arrangements shown in FIG. 1 and respectively bear the same reference numerals.

In this embodiment, the electronically controlled fuel injection system includes four first AND gates 68, 70, 72 and 74 the outputs of which are respectively connected through the lines 46, 38, 40 and 42 to the injection valves 30, 32, 34 and 36. The first AND gates 68–74 are respectively connected to outputs of the fuel injector actuation signal generator 44 at one inputs thereof. The other inputs of the first AND gates 68–74 are respectively connected through lines 76, 78, 80 and 82 to outputs of four NAND gates 84, 86, 88 and 90. Each of the NAND gates 84–90 has two inputs, one of which is connected through the corresponding one of lines 92, 94, 96 and 98 to an output terminal of a ring counter 100. The other inputs of the NAND gates are connected through a line 102 to an output of a second AND gate 104. The second AND gate 104 has two inputs respectively connected to the outputs of the first and second comparators 58 and 62 which are same as that shown in FIG. 1. Returning to the ring counter 100, the ring counter 100 has its trigger input connected to an output of a third AND gate 106 having a pair of inputs, one of which is connected through a line 108 to the fuel injector actuation signal generator 44 for receiving a trigger pulse train generated in the fuel injector actuation signal generator 44 every four strokes of a piston in a corresponding cylinder. The other input of the third AND gate is connected through a line 110 to the output of the second AND gate 104. The ring counter 100 operates so as to switch the logic 1 signal from one output terminal to another output terminal upon receipt of a trigger pulse through its trigger input.

With the above-described arrangements of this embodiment, the system is operated as follows:

When the engine 10 is started and the temperature of the coolant of the engine 10 is within 10° to 30° C, the second AND gate 104 produces a logic 1 signal on its output upon receiving the logic 1 signals from both the first and second comparators 58 and 62. The logic 1 signal from the second AND gate 104 is thereafter applied through the line 102 to all the NAND gates 84–90 and simultaneously through the line 110 to the third AND gate 106. The third AND gate 106, on simultaneously receiving the logic 1 signal from the AND gate 104 and the trigger pulse train from the fuel actuation signal generator 44, produces another logic 1 signal which is fed into the ring counter 100. Subsequently when, a logic 1 signal is connected by the ring counter 100, for example, to the output terminal 92, the NAND gate 84 produces a logic 0 signal which is applied through the line 76 to one input of the AND gate 68. It is to be noted that logic 0 signals appear on the remaining output terminals 94, 96 and 98 of the ring counter 100 and the corresponding NAND gates 86, 88 and 90 produce logic 1 signals which are respectively applied through the lines 78, 80 and 82 to inputs of the AND gates 70, 72 and 74. In this condition, the AND gate 68 prevents the fuel injector actuation signal from being applied to the injection valve 30, but the remaining AND gates 70, 72 and 74 allow the actuation signals applied to the injection valves 32, 34 and 36.

When the trigger pulse from the signal generator 44 is applied to the one input of the third AND gate 106, the logic 1 signal on the output terminal 92 decays and a logic 1 signal is switched to another output, for example, 94 of the ring counter 100. The logic 1 signal at the output 94 is applied to the associated NAND gate 86 through the line 94. The NAND gate 86 therefore produces a logic 0 signal on the output thereof which is transmitted to the associated AND gate 70 thereby preventing the associated injection valve 32 from opening. It is therefore to be noted that one of the injection valves 30–36 is prevented from opening even when the fuel injector actuation signals are generated at the outputs of the fuel injector actuation signal generator 44.

On the other hand, when the temperature of the coolant of the engine 10 is outside of the range 10° to 30° C, all the first AND gates 68–74 are caused to receive logic 1 signal from the corresponding NAND gates 84–90. The injection valves 30–36 therefore operate in response to the fuel injector actuation signals from the signal generator 44 in a conventional manner.

In order to provide a ready starting of the engine 10, the fuel injector actuation signal cut off system may be inactivated during initial cranking of the engine. FIG. 3 shows an example of a device for accomplishing the above-mentioned inactivation of the signal cut off system. In this example, a normally closed relay switch 112 including a pair of stationary contacts 114a and 114b, a movable contact 116 and a solenoid coil 118 is electrically disposed in the line 52 connecting the temperature sensor 50 and the signal amplifier 54. The solenoid coil 118 is arranged in a conventional engine starting circuit including a battery 120, a starter switch 122 and a starter motor 124. In operation, when the solenoid coil 118 is energized for cranking the engine 10 by closing the starter switch 122 as shown in dotted line, the movable contact 116 is shifted toward the solenoid coil 118 thereby interrupting the connection between the temperature sensor 50 and the signal amplifier 54. Thus, the voltage signal from the temperature sensor 50 is cut off. After the successful starting of the engine, the solenoid coil 118 is deenergized by the opening of the starter switch 122 and therefore, the movable contact 118 is returned to the closed position thereof.

It is now to be noted that the arrangement hereinbefore described may be applied to such an internal combustion engine having more or less than four cylinders.

It will be understood that the invention is not to be limited to the configuration shown and described and that various changes and modifications may be made without departing from the spirit and scope of the invention, as defined in the appended claims.

What is claimed is:

1. A fuel injection system for a multi-cylinder type internal combustion engine employing a catalytic converter in the exhaust system thereof comprising:
   a plurality of fuel injection valves respectively disposed in branch passages of an intake manifold of said engine, each of said valves being electronically operable by a fuel injector actuation signal;
   a temperature sensor mounted on said engine for producing a temperature signal representing the temperature of said engine;
   a fuel injector actuation signal generator having output terminals respectively connected to said fuel injection valves, for generating fuel injector actuation signals on the output terminals thereof;
   an AND gate having one input terminal connected to one of said output terminals of the fuel injector actuation signal generator, and an output terminal connected to the associated fuel injection valve;
   a first comparator for generating a logic 1 signal when the magnitude of the temperature signal is larger than a relatively low predetermined level;
   a second comparator for producing a logic 1 signal when the magnitude of the temperature signal is lower than a relatively high predetermined level; and
   a NAND gate for producing a logic 0 signal when it receives both of said logic 1 signals from said first and second comparators and for applying said logic 0 signal to the other input terminal of said AND gate for preventing said associated fuel injection valve from opening.

2. A fuel injection system for a multi-cylinder type internal combustion engine employing a catalytic converter in the exhaust system thereof comprising:
   a plurality of fuel injection valves respectively disposed in branch passages of an intake manifold of said engine, each of said valves being electronically operable by a fuel injector actuation signal;
   a temperature sensor mounted on said engine for producing a temperature signal representing the temperature of said engine;
   a fuel injector actuation signal generator having output terminals respectively connected to said fuel injection valves, for generating fuel injector actuation signals on said output terminals;
   at least two first AND gates, one of which gates has one input terminal thereof connected to one of some of the output terminals of said fuel injector actuation signal generator and an output thereof connected to its associated injection valve and the other of which gates has one input terminal thereof connected to another of said some of the output terminals of said fuel injector actuation signal generator and an output terminal thereof connected to its associated injection valve;
   a first comparator for generating a logic 1 signal when the magnitude of said temperature signal is larger than a relatively low predetermined level;
   a second comparator for generating a logic 1 signal when the magnitude of said temperature signal is lower than a relatively high predetermined level;
   a second AND gate for producing a logic 1 signal when it receives both of said logic 1 signals from said first and second comparators; and
   a cut-off pulse generator for generating periodically cutoff pulses in response to the signals from both of said second AND gate and said fuel injector actuation signal generator and for applying said cut-off pulses to the other input terminals of alternate one of said first AND gates.

3. A fuel injection system as claimed in claim 2, in which said cut-off signal generator includes:
   a third AND gate for producing logic 1 signal when it receives both of said logic 1 signals from said second AND gate and said fuel injection actuation signal generator;
   a ring counter for switching the logic 1 signal produced by said third AND gate from one output terminal thereof to another output terminal thereof; and
   at least two NAND gates having the output terminals thereof respectively connected to the other input terminals of said first AND gates, one of said NAND gates having one input terminal thereof connected to one of the output terminals of said ring counter and another input terminal thereof connected to the output terminal of said second AND gate, and the other NAND gate having one input terminal thereof connected to another of said output terminals of said ring counter and another input terminal thereof connected to said output terminal of said second AND gate.

* * * * *